United States Patent [19]

Cheng

[11] Patent Number: 5,037,191

[45] Date of Patent: Aug. 6, 1991

[54] ORTHOGONAL PARABOLIC REFLECTOR SYSTEMS

[76] Inventor: Dah Y. Cheng, 12950 Cortez La., Los Altos Hills, Calif. 94022

[21] Appl. No.: 455,518

[22] Filed: Dec. 21, 1989

[51] Int. Cl.$^5$ .............................................. G02B 5/10
[52] U.S. Cl. .................................. 359/858; 359/869; 359/852
[58] Field of Search ............... 350/613, 614, 619, 620, 350/628, 629, 630

[56] References Cited

U.S. PATENT DOCUMENTS

| | | | |
|---|---|---|---|
| 2,759,106 | 8/1956 | Wolter | 350/619 |
| 3,532,417 | 10/1970 | Tiemann | 350/619 |
| 4,484,334 | 11/1984 | Pressley | 350/628 |
| 4,557,569 | 12/1985 | Hacskaylo | 350/630 |
| 4,886,348 | 12/1989 | Schmertz | 350/613 |

Primary Examiner—Scott J. Sugarman
Assistant Examiner—J. P. Ryan
Attorney, Agent, or Firm—Cooper & Dunham

[57] ABSTRACT

An Orthogonal Parabolic Reflector is generated by rotating a parabolic curve 90° to the axis of symmetry passing through the focal point of the parabola. The Orthogonal Parabolic Reflector can concentrate a section of the linear source or sink on the axis of rotation to the focal point, resulting in integrating the intensity as a point source or sink at the focal point with almost no physical dimension effects.

20 Claims, 10 Drawing Sheets (P,0) to (P+2Q, 0) — Focal Line 2, 3

(P,0) to (P+2Q, 0) — Focal Line 2, 3

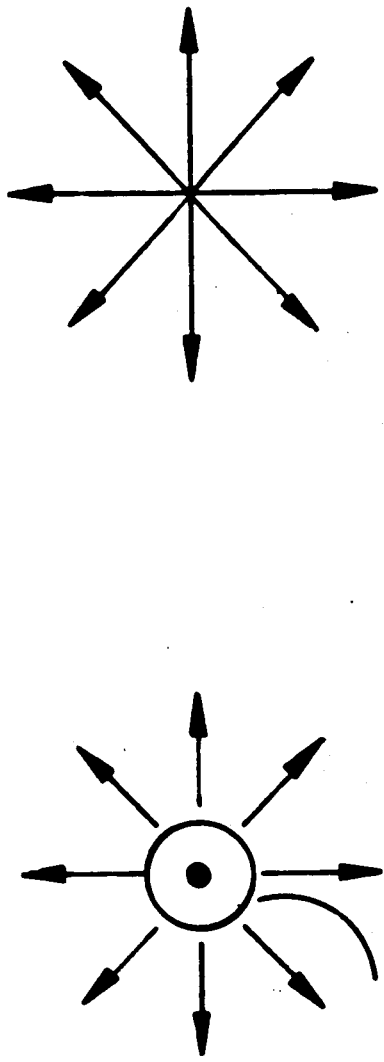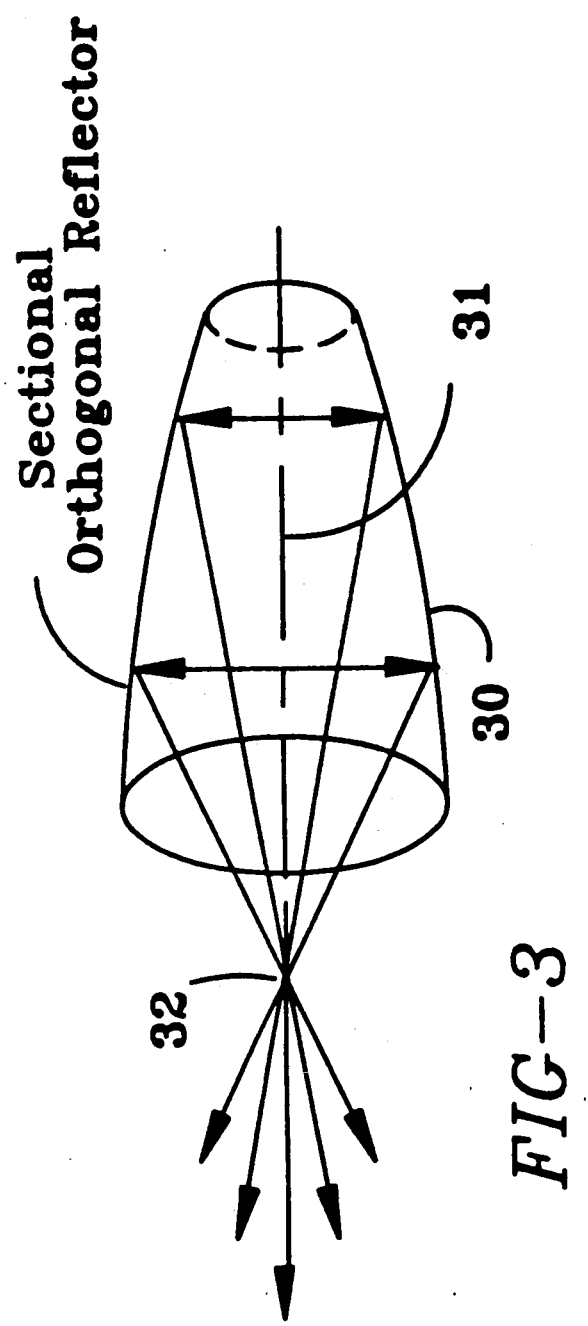
FIG-3

FIG-8 "Ray" Gun

Shadow Graph
Schlfren Interferrometry

ORTHOGONAL PARABOLIC REFLECTOR SYSTEMS

BACKGROUND

1. Field of Invention

A new optical concept for parabolic reflector design, which converts a line source or sink into a point source and sink, and its related applications.

2. Description of Prior Art

Parabolic reflectors have been used up to this date as an efficient means of converting a parallel beam of radiation to a point known as the focal point of the reflector. This is the way the radar antenna, microwave dish, long range telescopes and search lights are designed. To produce a high quality beam, a point source theoretically with no physical dimension should be placed at the focal point of the parabolic reflector. To enlarge an image or to shrink the image down, the smallness of the point source and the intensity of the source trades off with power input capability, and flux density with materials due primarily to heat. With the search light, the limitation is the electric arc spot size and current density. For other light sources, tungsten filament lamps are limited by the melting temperature of tungsten and the filament length. Spark sources can be better than most point sources but cannot be a continuous source; besides, the source still has a finite dimension. For optical calibration and other high resolution projection and detection, a point source is being filtered by spatial filters such as a pin hole. This cuts down the intensity of the source and still has the resolution limited by the dimension of the pin hole. From the detection point of view, the dimension of the linear array of detectors operating in-phase will be better than a single detector collecting signals at a point source, which will make it very difficult to single out signal from white noises. All this is due to the limitations of the traditional parabolic geometry. The perfect parabolic reflector can be described by the parametric equation $y^2 = 4px$, then rotated about the X-axis. Here p is the distance from the focal point to the bottom of the dish, and 2p will be radius from the focal point perpendicular to the X-axis. This geometry is what many optical devices are based on, with variations and perturbations, depending on applications. With this limitation, the future progress has been limited in many areas. For example: 1) the optical resolution of the light sources limits the line width of lithography when used to shrink printed circuit to a micro chip; 2) the optical resolution limits the resolution of shadowgraph when used to photograph aerodynamic flows; 3) the optical resolution limits the distance of search light and radar range; 4) in a movie projector, the arc spot intensity limits the screen size of a given negative size to still retain resolution and visibility; 5) the slide projector has an intense halogen lamp located at the focal point of a deep parabolic reflector, etc.

It is possible to make a source in a linear form such that the intensity locally can still be limited by material properties; however, the total intensity will be integrated along the linear source. This is not possible with the traditional parabolic reflectors. When such a need appears, a bank of parabolic reflectors each with its own point source or detectors are seen either as radar antenna farms or search light banks, each one still limited by their own resolution and intensity problems.

The following description of the newly invented Cheng Orthogonal Parabolic Reflector will overcome those problems and opens new applications hitherto unthinkable by designers.

OBJECT AND ADVANTAGES

The new invention is called the Cheng Orthogonal Parabolic Reflector geometry. This is a new geometry which can focus a linear radiation source to a focal point such that the intensity is an integral along the line of the radiation source, and the light at the focal point behaves as a nearly perfect dimensionless point source.

In the prior art parabolic reflector, the surface is generated by a parabolic equation $Y^2 = 4px$, then rotated about the X-axis to generate the surface. The X-axis is also the symmetrical axis of the parabolic curve.

The newly invented Orthogonal Parabolic Reflector also generates the reflecting surface by a parabolic curve, except the curve is rotated 90 degrees from the symmetrical axis about a line passing through the focal point and perpendicular to the axis of symmetry. This is why the inventor calls it "Orthogonal Parabolic Reflector".

It is well known that a perpendicular line to the axis of symmetry will be focused onto the focal point of the parabola. If the line happens to be passing through the focal point also, then a surface generated by rotating the parabolic curve about that line will have surprising properties. If there is a segment of a linear source located somewhere along the line, the radiation from the line will be focused onto the focal point and will appear as having nearly no dimension. The intensity appearance at the focal point will be an integral of the linear line source intensity. If the line source is coherent, the path length anywhere from the line source to the focal point is a constant, and the light at the focal point will remain coherent. On the other hand, if a compound system is receiving signal from a distant source, then an array of line detectors can be made as coherent or coincident detectors to filter out noises which appear to be out of phase. This will increase the gain of the detector many folds without increasing the physical size or number of the antenna.

The Orthogonal Parabolic Reflector can be made to be a part of compound systems for many applications. They are too many to be enumerated; only a few examples will be presented later.

This is a major breakthrough in geometrical radiating systems.

DRAWING FIGURES

FIG. 3 illustrates the properties of the Orthogonal Parabolic Reflector which can create a substantially dimensionless point source.

DESCRIPTION-FIGS. 1 TO 10

Figure 1:
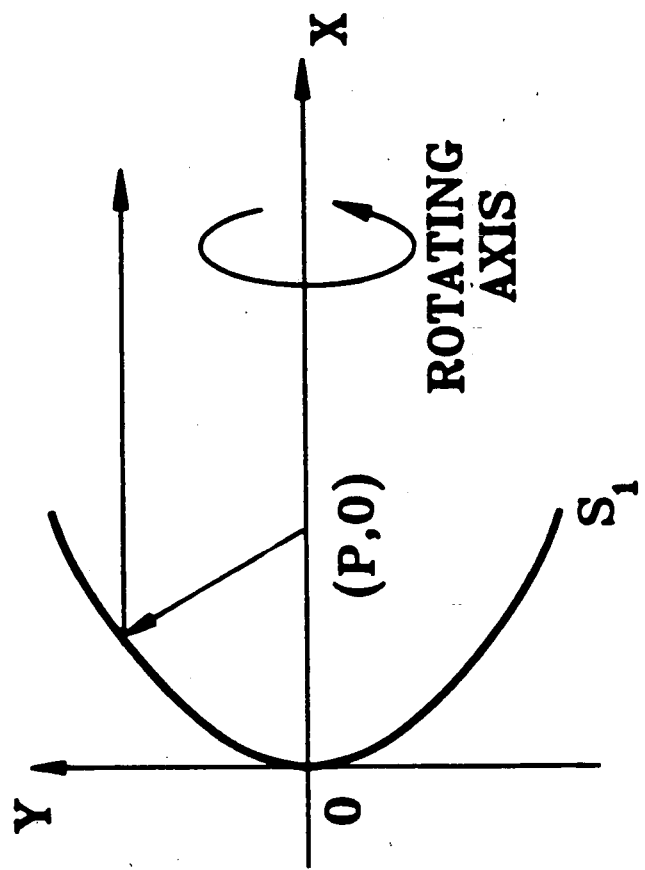
FIG. 1 depicts an ordinary parabolic reflector.

FIG. 1 describes an ordinary parabolic reflector. The reflector is viewed in an x and y coordinate system, and the surface of the reflector is generated by a typical parabolic function, $y^2 = 4px$ rotated about the axis of symmetry X-axis. P is the focal point of the parabola located at the position $x = p$ and $y = O$. The focal point (P,O) depicted here is where a point source normally will be located such that the point source will be reflected by the parabolic reflector to become a parallel beam. On the other hand, if the parabolic reflector is a receiver, then in the parallel direction of the parabolic mirror axis, the signal will be focused onto the focal point (P,O) where a detector will be located. Moving away from the focal point will focus the beam at a distance or diffuse the beam with a given angle.

Figure 2:
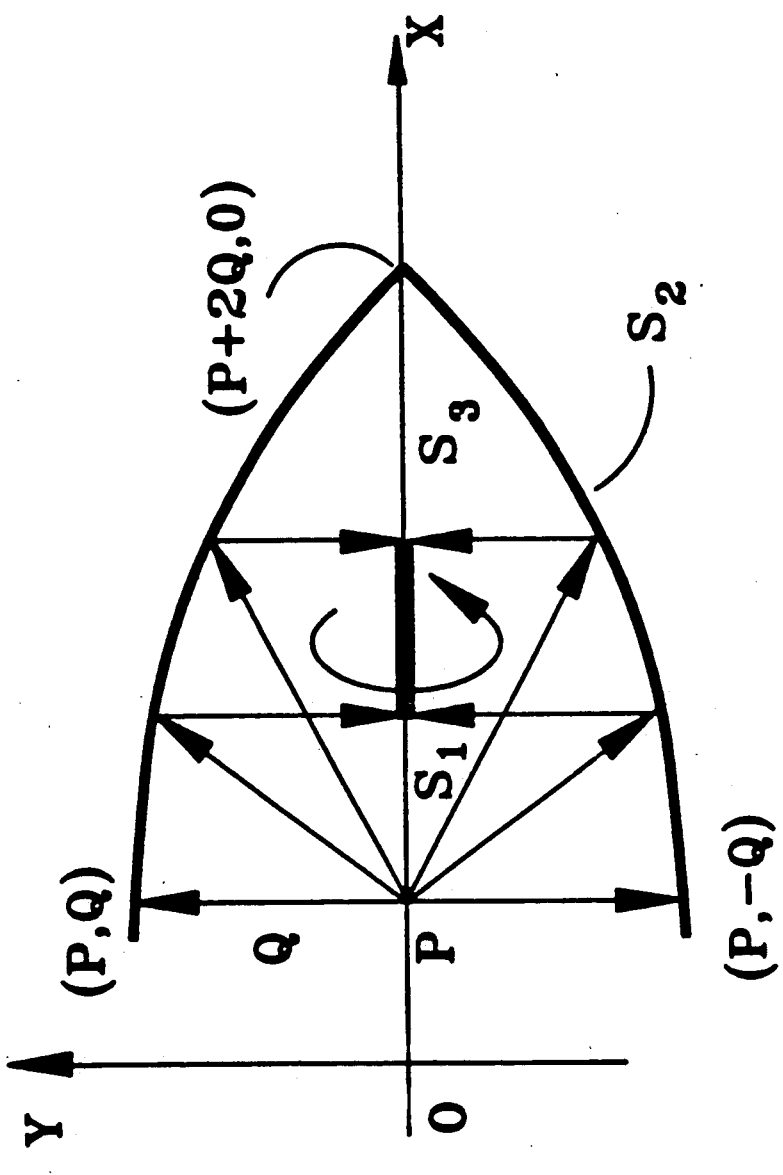
FIG. 2 is an illustration of the newly invented Orthogonal Parabolic Reflector.

FIG. 2 is the Orthogonal Parabolic Reflector. Assuming there is a focal point located in the same place at $x = p$ and $y = O$, the parabolic surface in the 90 degree direction can be described by the equation $(x - P)^2 = 4Qy$. In this case, Q will be the focal distance of the new parabolic curve, and the line from (P,O) to (P,Q) will be the axis of symmetry for the parabolic curve. Instead of rotating about the symmetrical axis from (P,O) to (P,Q), the Orthogonal Parabolic surface is generated by rotating about the X-axis also, which will be in the 90 degree direction from the symmetrical axis from the focal point to the bottom of the parabolic curve. As one can see, the near linear source as depicted here from $S_1$ to $S_3$ will all be reflected at the focal point at the position (P,O), and the linear source from $S_1$ to $S_3$ is on the axis of the Orthogonal Parabolic Reflector; therefore, the intensity at the focal point is a sum of the linear source limited by the same material properties. The result is that the intensity can be multiplied by integrating the total energy source from $S_1$ to $S_3$, and the energy will arrive at the focal point (P,O) and will be intensified by orders of magnitude of a point source with the same material limitations. In the meantime, the distance anywhere within the linear source $S_1$ to $S_3$ to the focal point are equal; therefore, if the source is a coherent light source, the point source at the focal point also will be coherent.

FIG. 3 illustrates the dimensionless point source capability of the Orthogonal Parabolic Reflector. The top part of FIG. 3 illustrates a dimensionless line source would have the same property as a cylindrical surface radiating at a constant intensity. The cylindrical surface is described by the constant intensity flux surface. This is the principle of source and sink, that there is a number of concentric rings about the point/linear source having the same total flux. The flux density times the surface area of these concentric circles is a constant, which is the same as a linear source which does not have a physical dimension. In another point of view, the radiation from a cylindrical surface appears to be emitted in the center of the cylinder without a physical dimension. If we can focus this linear source onto a point, then the radiation at that point is dimensionless. This is only achievable by the newly invented Orthogonal Parabolic Reflector. 30 illustrates the position of the orthogonal reflector, which is truncated by the necessary sections only. 31 illustrates the position of the line source or sink. 32 is the resultant focal point which concentrates the energy emitted from the line or cylindrical radiation source onto the focal point 32. At the focal point 32, the radiation appears to have no apparent dimensions, and the equal distance from the focal point reflected to the axis is unique of the Orthogonal Parabolic mirrors. If the light source emits a coherent radiation, then at the focal point in all angles, the light also will be emitting as a coherent point source. Due to the fact there is no material present at the focal point 32, there is no material limitation in terms of the physical size and energy density or flux densities. Due to the apparent dimensionless property, the spatial filter located at that focal point will not reduce the intensity of the radiation source. This is another one of the breakthroughs of using Orthogonal Parabolic Reflectors in addition to the capability of increased intensity. This property will enable the light to be emitted with excellent beam quality.

Figure 4:
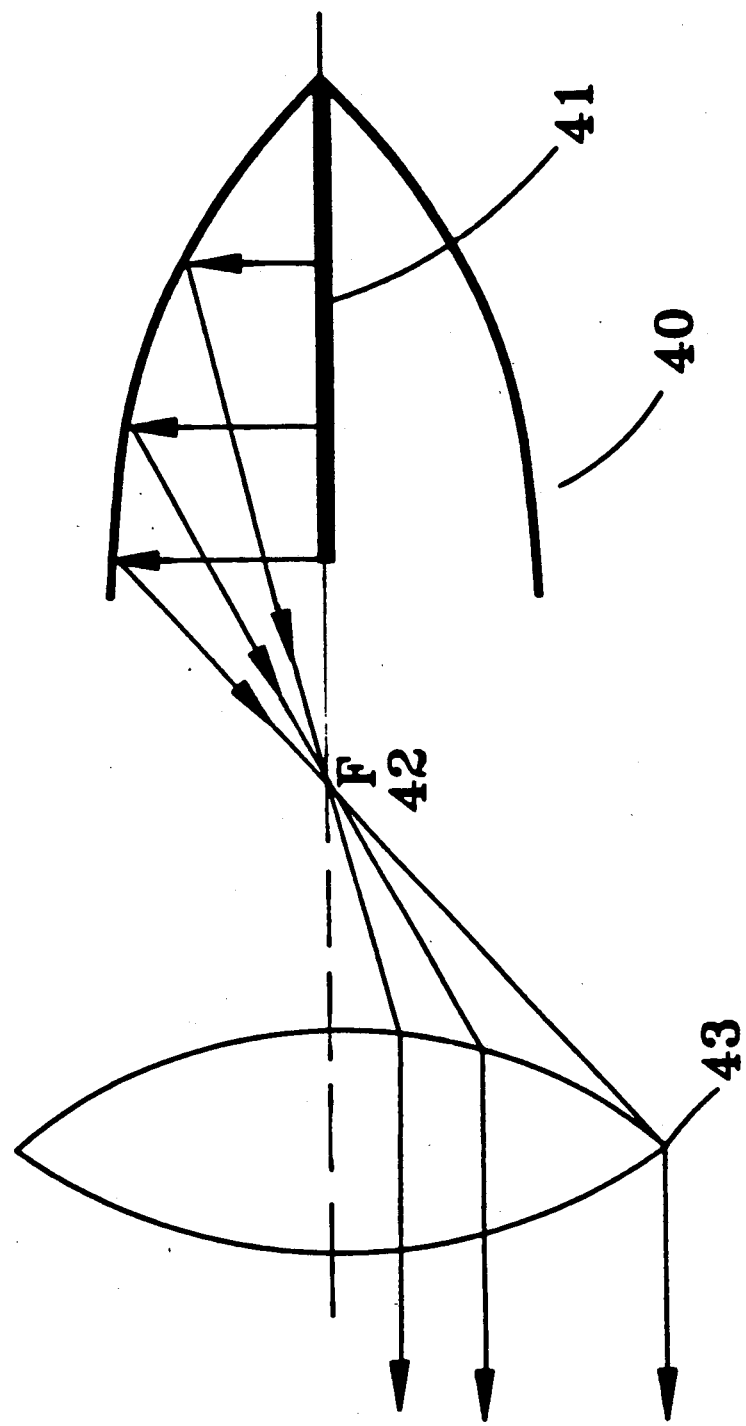
FIG. 4 is an illustration of the compound system utilizing the Orthogonal Parabolic Reflector and an ordinary optical lens system.

FIG. 4 illustrates that one can use an Orthogonal Parabolic Reflector in an optical application such that the reflector is depicted again by 40 and the light source 41 and the focal point 42. However, if there is an optical lens 43, which would have the same focal point at 42 depicted by the letter F, then this lens will convert a linearly produced radiation source into a parallel beam. A parallel beam can be applied to many uses; typically, optical interferrometers, projector systems, shadowgraphs, lithographs, photographs, calibration, and in many other radiation applications, including sound system designing, etc. The applications require the resolution to be high and is limited by the dimension of the point source and the light intensity, with the new point source having no dimension. Then the resolution will be enhanced by orders of magnitude. This is only possible by using the Orthogonal Parabolic Reflectors.

Figure 5:
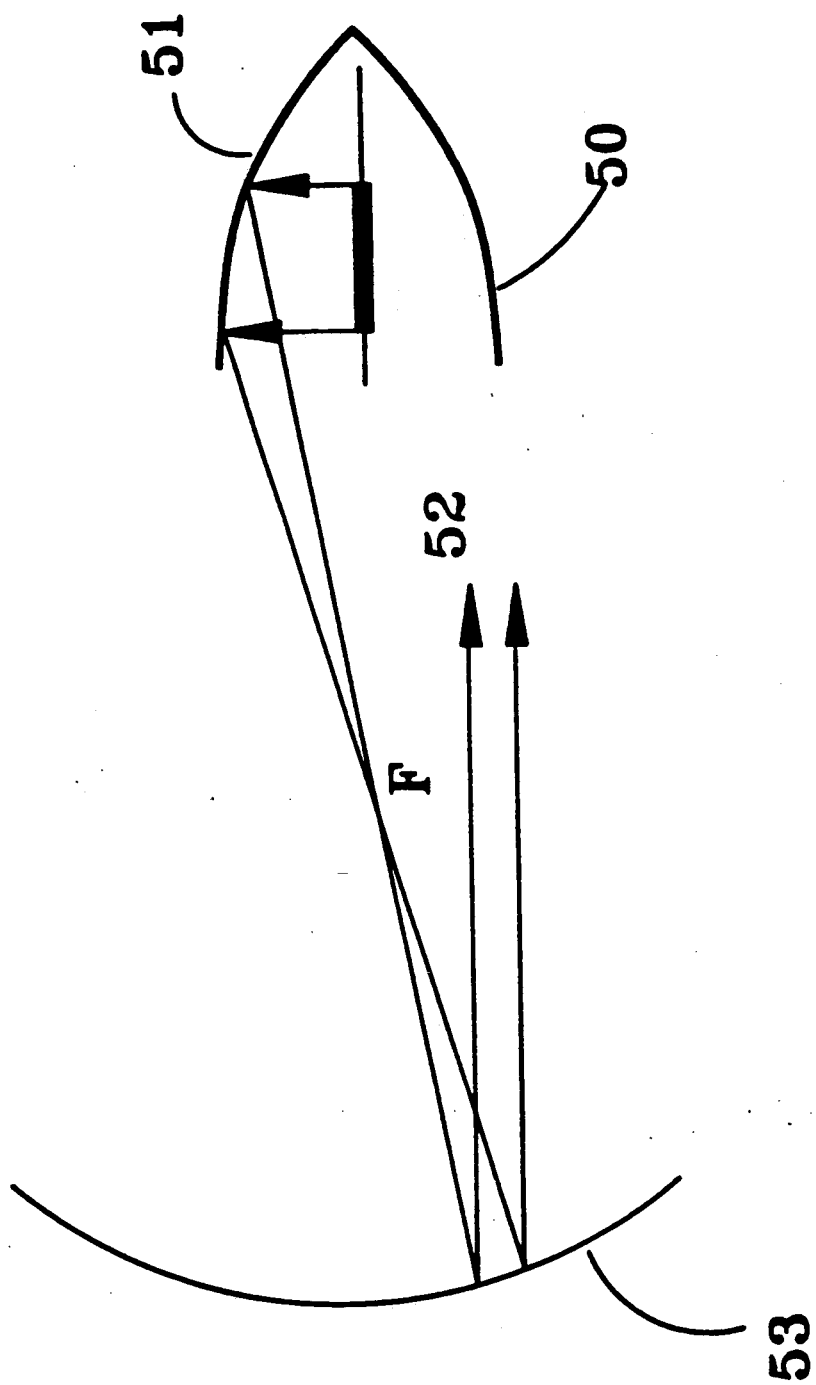
FIG. 5 is another example of a compound orthogonal reflector with an ordinary parabolic reflector.

FIG. 5 depicts yet another application such as a microwave or radar antenna, where an Orthogonal Parabolic Reflector is used in conjunction with a regular parabolic reflector. In this case, the parabolic reflector will share the same focal distance of focal point F with the Orthogonal Parabolic Reflectors. The Orthogonal Parabolic Reflector is depicted by 50; a linear source or detector array is depicted by 51; the focal point, 52; the parabolic reflector, 53. The combination of these two reflectors gives either increased intensity of the radiation due to its inherent radiating power, or increased gain property of detection due to the coherent receiving ability of distant signals. Perturbing the focal points of the two will also focus the beam or diverge the beam with a given angle.

Figure 6:
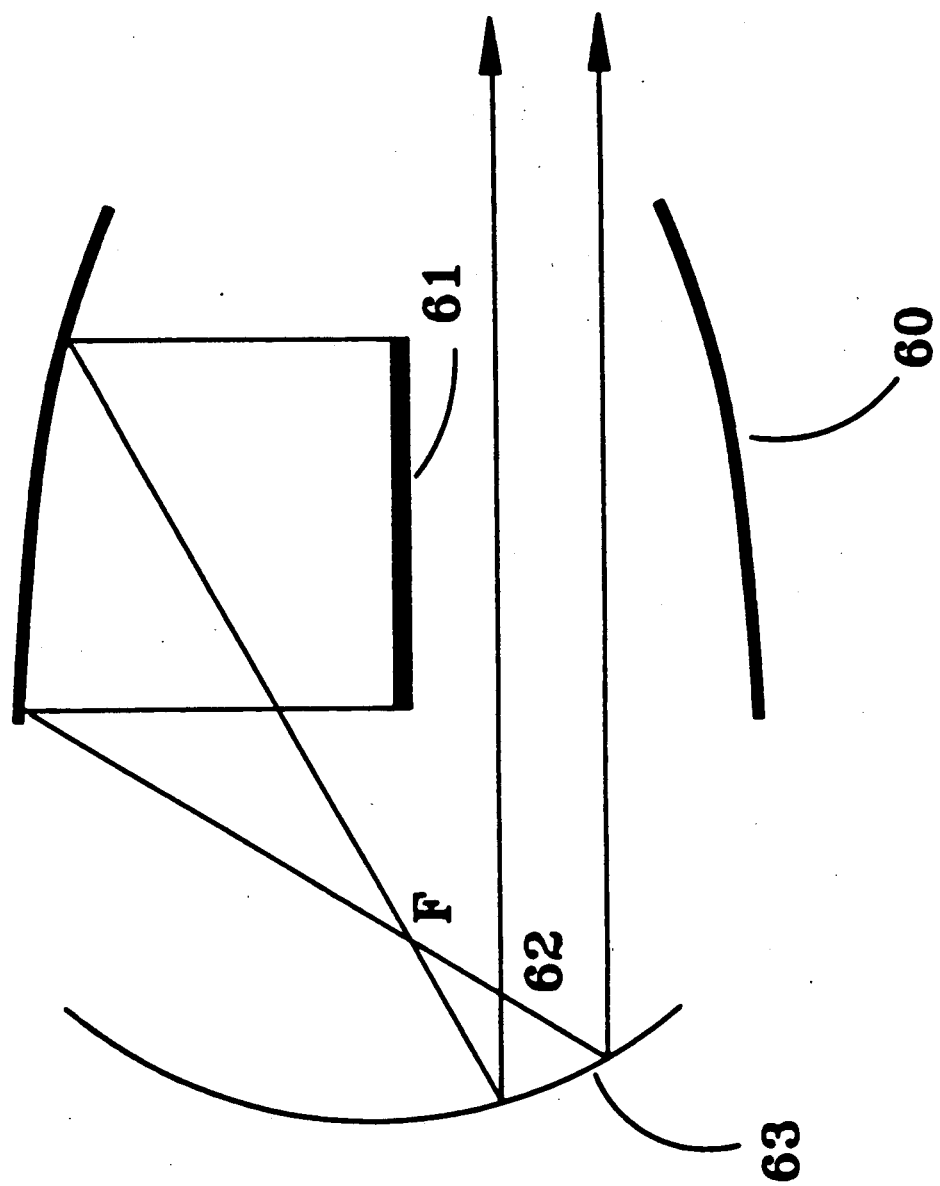
FIG. 6 illustrates another Orthogonal Parabolic Reflector compounded with a regular parabolic reflector.

FIG. 6 illustrates another use of a compound Orthogonal Parabolic Reflector with an ordinary parabolic reflector sharing the same focal point F at 62. The linear source in this case could be a xenon lamp oriented in the actual direction of the ordinary parabolic reflectors. 60 reflects a section of the Orthogonal Parabolic Reflector. The linear radiation source 61 reflects from the Orthogonal Parabolic Reflector and is focused at the same focal point as the parabolic reflector 63, which creates an intense parallel beam. In this case, the reflector has a very short focal distance; therefore, the intense beam will have a diameter smaller than the sectional opening of the Orthogonal Parabolic Reflectors. Such an application is good for a focused xenon flash lamp such that the light will be more focused in the direction of the reflector.

Figure 7:
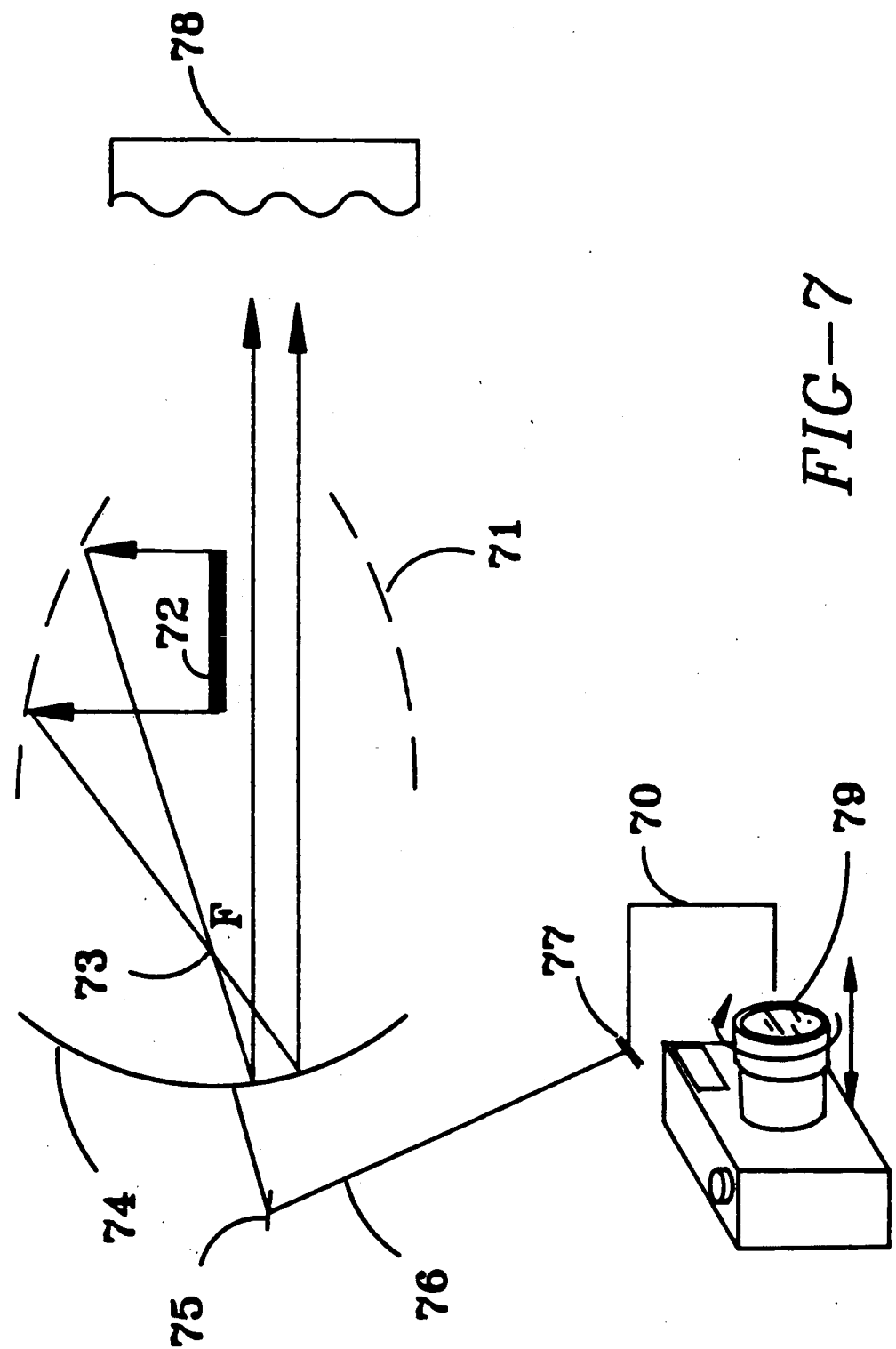
FIG. 7 illustrates a focused and zoom xenon lamp with camera.

A simplistic illustration of using this combination in conjunction with a zoom camera is depicted in FIG. 7. The automatic zoom camera or zoom camera will focus its image by zooming the image into the focal plane of the camera using the movement of a telescopic lens. The movement of the lens can go through a series of mechanical levers to also move the ordinary parabolic reflector slightly in order to focus the beam at a certain given distance. 71 is the Orthogonal Parabolic Reflector, and 72 is the linear light source of a xenon lamp or an intense tungsten filament. 73 is the focal point common to both reflectors. 74 is the ordinary reflector; 75 is the hinge linking the Parabolic Reflector to a lever with a hinge point at 76, and the lever 77 will link to a position anchored to the camera zoom lens, 70. The zoom lens is being depicted by 79. Therefore, the focal point of the spread of the light will coincide with the zoom lens images. Other accessories can be added to the front such as a washer plate diffuser, depicted as 78. Many other additions can be thought of as an add-on to the automatic zoom flash lamp system, or just a zoom lamp system, depending on the light source.

Figure 8:
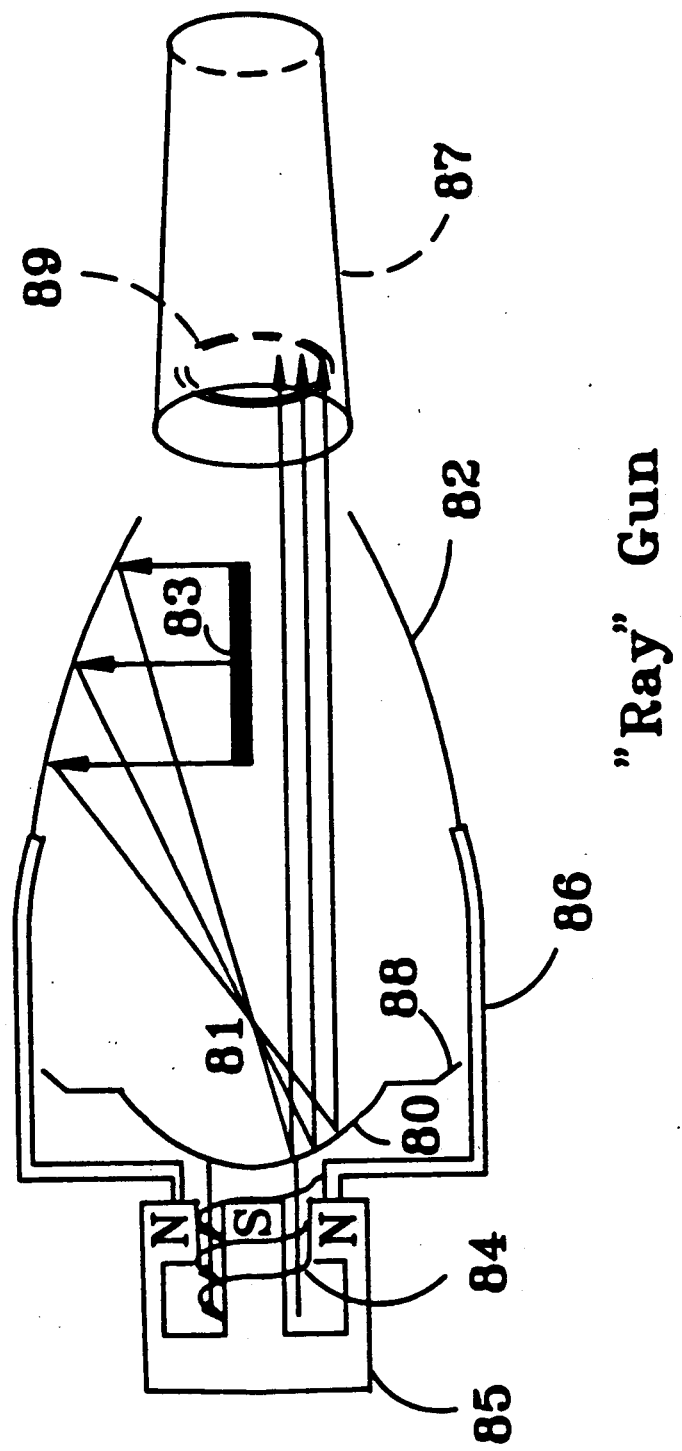
FIG. 8 illustrates the electrically driven compound system with an air pusher through a nozzle in conjunction with light.

·FIG. 8 describes yet another compound ordinary parabolic reflector with Orthogonal Parabolic Reflectors with a linear source. In this case, the parabolic reflectors were energized by the electromagnetic transducer such as a speaker voice coil 84. If the case is part of a small speaker system, then the reflection will focus the beam along the axis of the light source 83. The Orthogonal Parabolic Reflector is depicted by 82. The source is depicted as 83; the focal point, 81; a speaker of pusher type, 88, with a check valve to induce air into the system. 80 is the parabolic reflector; 84 is an electromagnetic coil as part of a linear transducer; 85 is a magnetic system which would interact with the magnetic coil 84. 86 is the supporting frame. If the flash lamp is fired, yet the reflector is also being moved by another means, then the light can be shined on the target as first focused, then gradually unfocused. If the movement is energetic enough to push air, the air can be converged through another attachment nozzle 87 to become a high-speed ejector of a smoke ring with sound, and the smoke can be generated by other means, such as a smoke ring generator, depicted by 89. A combination of this can be made into an imaginative toy which has magical visuals and sensational effects. The device can be used to demonstrate the different speeds of propagating methods.

Figure 9:
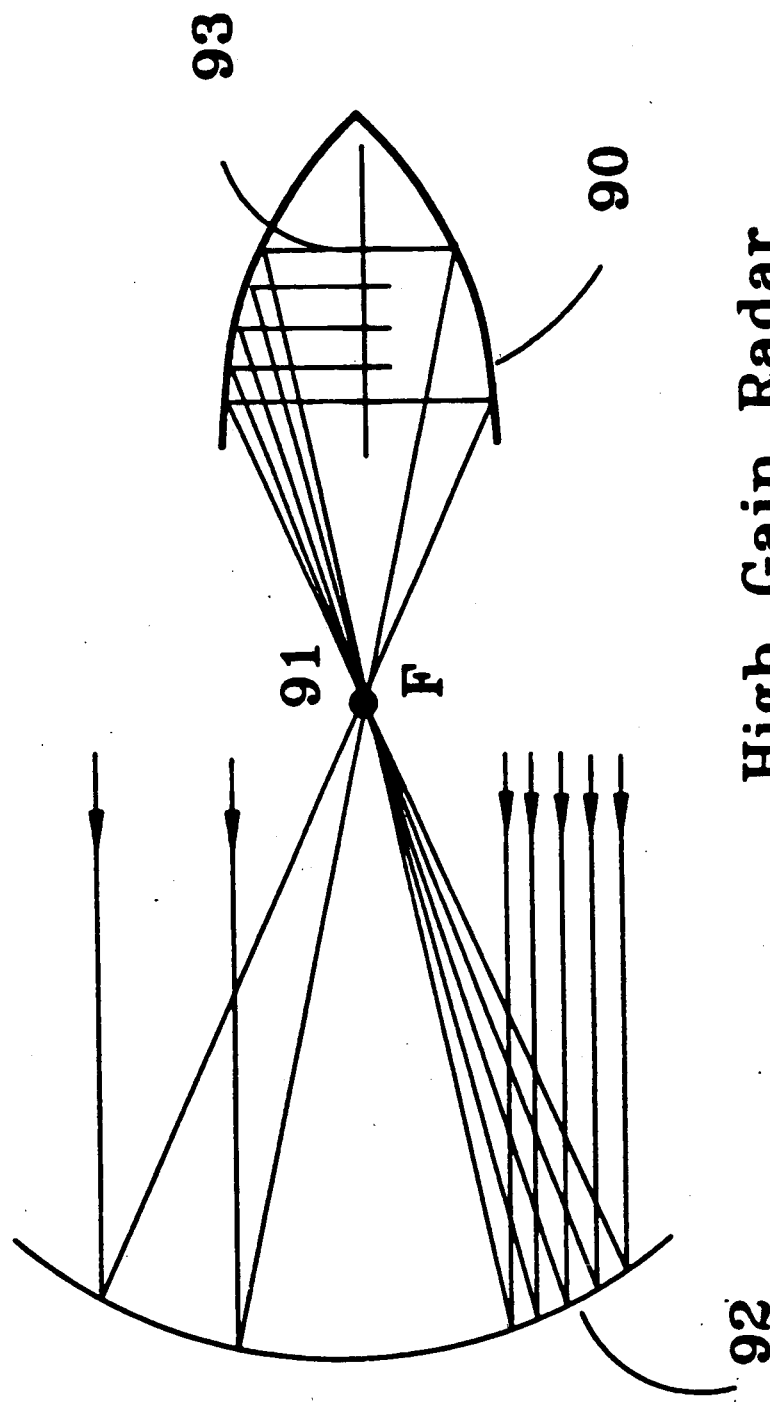
FIG. 9 illustrates the application of a compound orthogonal reflector and ordinary reflectors as a high gain antenna for the purpose of detecting coherent or coincident signals from far away.

FIG. 9 illustrates the use of the Orthogonal Parabolic Reflector 90 and the parabolic receiving reflector 92, which will focus the signal through 91 and reflect the signal on a detector, 93. The microwave signal detection from distant stars due to its linear array of detectors can be viewed as coincidental detectors; therefore, using the phase locked signal detection and discrimination, which would synchronize the signal in a spatial sense through identifying the real signal with a certain spatial resolution, rejecting the random noise from the air current and other reasons. This eliminates multiple antenna array currently being used.

Figure 10:
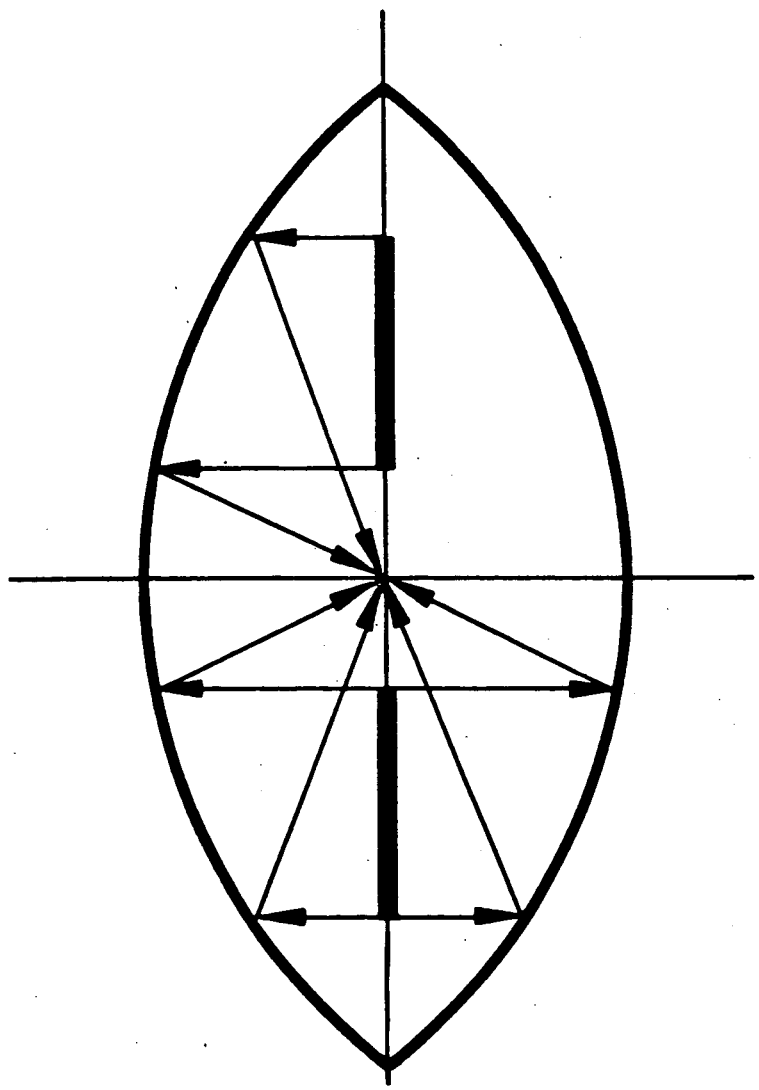
FIG. 10 illustrates the complete Orthogonal Parabolic Reflector which consists of two linear radiation sources.

FIG. 10 is the illustration of a complete orthogonal reflector. The shape will be like an American football. The two linear sources placed on the axis, if were very powerful radiation sources, can be focused onto a point of almost no dimension, and such an intense source can be used as a calibration standard or can be used for laser fusion and in many other applications for dimensionless point source with extremely high intensity. On the other hand, it also can be used as sensitive detector to discriminate signals against noise.

Operation—FIGS. 2, 3, 4, 5, 10

From the description above, a number of my inventions become evident:

a) From FIG. 2, the linear source or sink (detector) from $S_1$ to $S_3$ can be arbitrary in length so only a section of the Orthogonal Parabolic Reflector (OPR) would be needed. This provides the option to combine OPR with other systems.

b) From FIG. 2, the OPR is described by two parametric constants, P and Q. P is usually associated with the focal distance of ordinary optical systems. Q is the orthogonal focal distance of OPR which provides a flexible choice for system design.

c) The geometry from FIG. 2 is applicable to all radiation and detecting systems such as sound, or electromagnetic waves.

d) From FIG. 3, the physical constraint of a linear source is relaxed in that as long as the radiation is from a constant flux density cylindrical surface, it will be focused to a dimensionless point source at the focal point. The advantage of a dimensionless point source to signal propagation and detection is unlimited. It is anticipated that the OPR surface can be generated by rotating the parabolic surface about any line perpendicular to the axis of symmetry, where the line source will focus the light as a focused ring. It is also anticipated the parabolic curve can be composed of a number of different focal length parabolas.

e) From FIGS. 4 and 5, just the simple compounding system should improve the beam quality. Instead of increasing the power, due to its improved beam quality, it can afford to lower the power to achieve the same results. The advantage of using a linear source will immediately alleviate the difficulties of developing intense point source, such as spark, arc, and microwave transmitters as examples. It is also pointed out that the linear source can be in the form of a small cylindrical surface. This means spiral wound filaments in cylindrical form of spiral wound discharge tubes will not degrade the beam quality very much. The advantage of signal detection warrants further description. FIG. 9 illustrates the line array of detectors when detecting a signal, say from a distant star. The spatial resolution of the signal far exceeds the dimension of any man-made antenna dishes. Due to noise perturbing the signal, such as atmosphere density fluctuation, the solar wind and other astronomical perturbations, will cause the signal to have a higher noise level sometimes than signals. Since the detector array will receive the signal from the antenna focal point at the same distance and time, the beat frequency among all the detectors will bring out the coherent signal and filter out the noise. This may eliminate a giant array of microwave dishes for the same purpose.

f) From FIG. 10, it also solves the optical problem of laser fusion. In laser fusion, multiple laser beams are shined on a target. Ideally, the beam should be a constant spherical implosion onto the target. Since the beam has to be focused individually, the ideal implosion condition just cannot be achieved. With this OPR concept, the radiation can be obtained from say a linear intense Z-pinch, which can provide more power to the point sink than even the laser systems.

g) The advantage of a zoom xenon flash lamp is unique in that zoom lens cameras have current improvements in that the camera's flash lamps now are equipped with light integrators to cut off the xenon discharge. This only applies to close distance objects. When the zoom lens is focused onto a distant object such as in the ballpark, presidential conferences and animals in the wild, flash lamps are useless at this moment. With a zoom flash lamp, one can put the light where the camera is also zooming in. This will not be limited to cameras. For instance, the spotlight has trouble dissipating its heat. The spotlight for VHS cameras can be more efficient, thence saving electric power. Halogen lamps can be made to have long filaments to distribute the heat loss with a built-in OPR onto the bulb. The combination of air pushing and OPR and a nozzle will be a unique scientific instrument to demonstrate different wave propagating speeds.

SUMMARY, RAMIFICATIONS AND SCOPE

To summarize the disclosure of the invention, a totally new geometrical reflector is disclosed. The geometry is given a name as Orthogonal Parabolic Reflector (OPR), or simply Cheng Reflector. The object of the reflector is to transform a linear source or sink (detector) onto a single focal point, where the resultant radiation at the focal point will theoretically not have a physical dimension, and if the point is surrounded by a vacuum vessel, there will not be a power or intensity limitation as well. The description above contains many specificities; however, they should not be construed as the limit of the scope of the invention, but as merely providing illustrations of some of the presently preferred embodiments of this invention. For example, the improvement in material for the construction of the reflector surface can contain selectivity properties of wave length or frequencies so that the system will only reflect according to OPR principle within those wave lengths and frequencies. The perturbation away from the perfect position sometimes is also desirable for special applications. The deviation will be considered obvious by the inventor.

The limitation of the OPR will be bound by a 45° cone where Q in the equation goes to infinite where the focal point P will be at infinite also. In the case of large cylindrical light sources, sometimes it may produce its own shadow effect. This can be overcome by light emitting from the ends of the source, sometimes even with the help of a smaller lens. It will only be needed in extreme special cases.

I claim:

1. A structure comprising:
   a reflecting surface generally conforming to a surface generated by rotating a portion of a parabolic curve about an axis perpendicular to the axis of the parabola defined by said curve; and
   an elongated source/sink which extends generally along the axis of rotation and is at least partly enveloped by said reflecting surface.

2. A structure as in claim 1 in which the reflecting surface is open at one side along the axis of rotation, to receive/emit radiation, and is substantially closed at the other side along the axis of rotation.

3. A structure as in claim 1 in which the reflecting surface is open at both sides along the axis of rotation, to receive/emit radiation at least through one of the open sides.

4. A structure as in claim 1 in which the reflecting surface has a focal point substantially at the axis of rotation and including a lens having a focal point which also is substantially at the axis of rotation.

5. A structure as in claim 4 in which the focal points of the reflecting surface and of the lens substantially coincide.

6. A structure as in claim 4 in which the focal points of the reflecting surface and of the lens are relatively movable through a range of positions including a position in which the two focal points substantially coincide.

7. A structure as in claim 1 in which the reflecting surface constitutes a first reflecting surface having a first focal point substantially at the axis of rotation and including a second, parabolic reflecting surface facing the first surface and having a second focal point which has a selected spatial relationship relative to the first focal point.

8. A structure as in claim 7 in which the first and second focal points are movable relative to each other through a range of positions including substantial coincidence with each other.

9. A structure as in claim 1 in which the reflecting surface constitutes a first reflecting surface having a first focal point which is substantially at the axis of rotation and including a second, parabolic reflecting surface facing the first surface and having a second focal point which has a selected spatial relationship relative to the first focal point, wherein the first reflecting surface is open at both sides along the axis of rotation, to receive/emit radiation through both open sides.

10. A structure as in claim 9 in which the first and second focal points are relatively movable through a range of relative positions including a position in which the focal points substantially coincide.

11. A structure as in claim 9 in which the first and second focal points substantially coincide.

12. Structure as in claim 1 in which said reflecting surface constitutes a first reflecting surface having a first focal point and said structure further includes: (i) a second reflecting surface having a second focal point having a selected spatial relationship relative to the first focal point; (ii) a camera having a zoom lens provided with optical elements movable relative to each other; and (iii) a mechanism interconnecting the zoom lens and at least one of the first and second reflecting surfaces to change the spatial relationship between the two focal points.

13. A structure as in claim 12 including a light source cooperating with at least one of said reflecting surfaces to form a first light beam impinging on the other reflecting surface, wherein said mechanism changing the spatial relationship of the two focal points thereby changes the degree of convergence/divergence of the light beam caused by its reflection from said other reflecting surface, and whereby said light beam is focusable in a manner related to the focusing of the zoom lens.

14. A structure as in claim 1 in which the source/sink comprises an elongated detector of radiation reflected onto the detector by the reflecting surface.

15. A structure as in claim 14 in which said detector is a microwave radiation detector.

16. A structure as in claim 14 in which said detector comprises a linear array of detector elements extending along the axis of rotation.

17. A structure as in claim 1 in which the reflecting surface comprises a substantially closed 3D surface.

18. A structure as in claim 17 in which the source/sink comprises at least one elongated source sink extending generally along a part of the axis of rotation which the reflecting surface encloses and a point sink/source at the center of the 3D reflecting surface.

19. A reflector comprising:
a reflecting surface generally conforming to a surface generated by rotating a portion of a parabolic curve about an axis perpendicular to the axis of the parabola defined by said curve;
said reflecting surface being truncated along two spaced apart planes which are transverse to the axis of rotation.

20. A reflector as in claim 19 including an elongated source/sink extending at least partly along the axis of rotation of said portion of a parabolic curve and at least partly enveloped by said reflecting surface and an optical element which has a focal point generally coinciding with said axis of rotation.

* * * * *